Feb. 18, 1941.  D. W. THOMPSON  2,232,291
HOG CATCHER AND HOLDER
Filed April 3, 1939
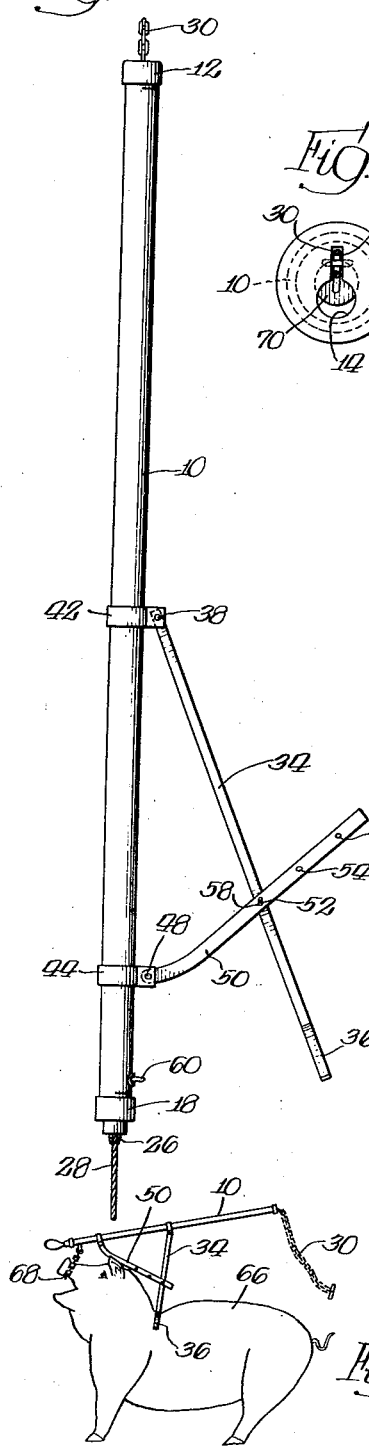
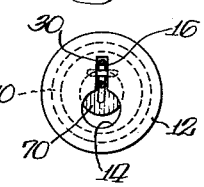
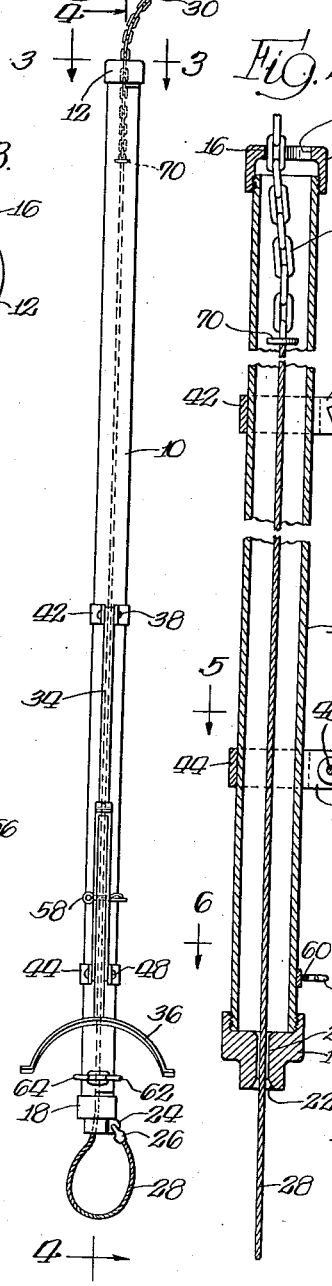
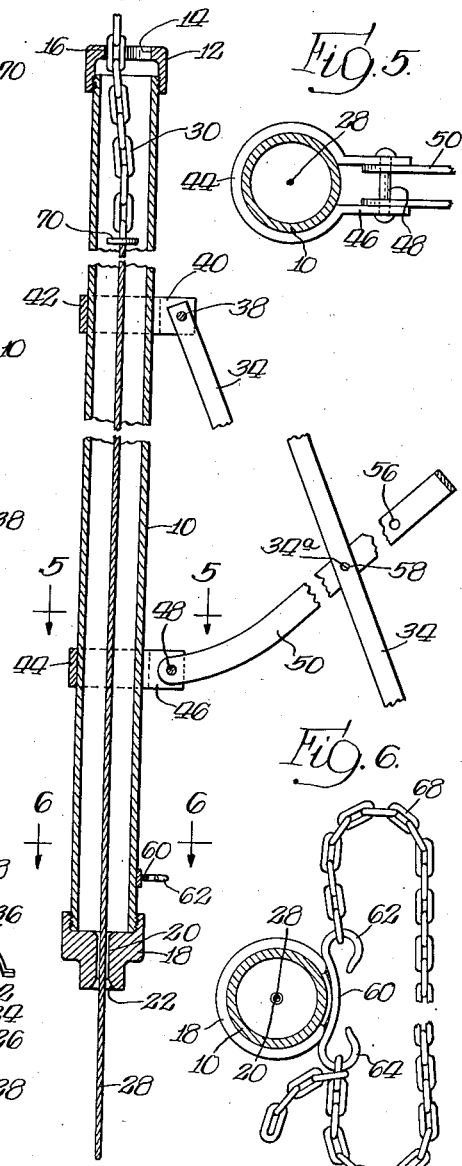
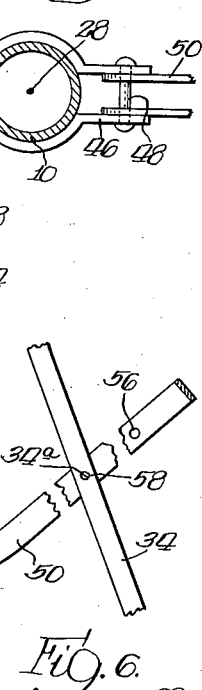
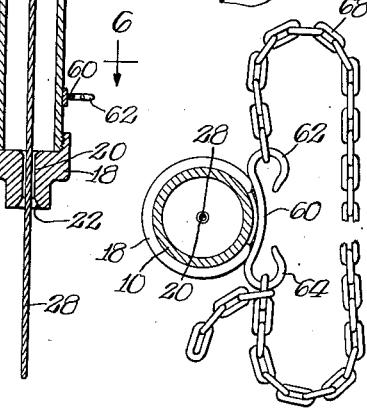
INVENTOR.
David W. Thompson,
BY Bair & Freeman
ATTORNEYS.

Patented Feb. 18, 1941

2,232,291

UNITED STATES PATENT OFFICE 2,232,291

HOG CATCHER AND HOLDER

David Watson Thompson, Unionville, Mo.

Application April 3, 1939, Serial No. 265,648

11 Claims. (Cl. 119—151)

My invention has reference to that class of devices or appliances utilized for catching and/or holding domestic animals by means encircling the snout or muzzle of the animal.

An object of my invention is to supply a catching or holding device of the general character referred to, such that after the animal is caught the device will enable the user to hold or control the animal with one hand.

Another object of my invention is to provide a device of the type described such that when it is used it will not hurt or injure the animal.

Still a further object is to provide a device of the kind described by which the user is enabled to open the mouth of the animal for purposes of examination or for administering a capsule or other medicines.

A further object is to provide such a device which can be adjusted to accommodate different sizes of animals.

A further object is to provide a device of the type referred to which will be easy to use and simple and economical to manufacture.

With these and other objects in view, my invention consists in the construction, arrangement and combination of the various parts of my device whereby the objects contemplated are attained, as hereinafter more fully set forth, pointed out in my claims and illustrated in the accompanying drawing, in which—

Figure 1 is a side elevation of a construction embodying my invention.

Figure 2 is a rear elevation of the same construction.

Figure 3 is an enlarged view partly in section taken on the line 3—3 of Figure 2.

Figure 4 is an enlarged vertical sectional view taken on the line 4—4 of Figure 2.

Figure 5 is an enlarged horizontal sectional view taken on the line 5—5 of Figure 4.

Figure 6 is an enlarged horizontal sectional view on the line 6—6 of Figure 4.

Figure 7 is a view illustrating a stage of the operation of my device as used in handling a hog.

On the accompanying drawing I have used the reference numeral 10 to indicate generally a tube. At one end of the tube 10 is a cap 12 having therein an opening consisting of an enlarged portion 14 and a slot 16 as shown in Figure 3. At the end of the tube 10 opposite the cap 12 is a guide cap 18, having therein a longitudinal hole 20. The outer end of the hole 20 may be flared in a generally conical form as at 22. A lug 24 is formed on the cap 18 and to the lug 24 is attached an eye 26.

One end of a small flexible cable or cord 28 is secured in the eye 26, the cable then passing through the hole 20 in the guide cap 18 to the inside of the tube 10. A chain 30 is attached to the inner end of the cable 28 and terminated with a handle 32 of any suitable type.

It will be seen that when the chain 30 is passed through the enlarged portion 14 of the opening in the cap 12, pulling on the handle 32 will cause the cable 28 to be retracted through the hole 20 and consequently the external loop of the cable 28 will engage whatever object it encircles. When such engagement is secured it may be retained by slipping the chain into the slot 16 of the opening in the cap 12 as indicated in Figure 3, so that the tension on the handle 32 need not be maintained.

Further increasing the utility of my device in handling animals I provide a bar member 34 having at one end a yoke portion 36. The end of the bar 34 opposite the yoke 36 is pivoted by a bolt 38 passing through the bar and through ears 40 on a split collar 42. A second split collar 44 is provided with ears 46, and pivotally fastened therein by a bolt 48 is a U-shaped spacer 50 having a plurality of pairs of perforations 52, 54 and 56. The collars 42 and 44 may be welded or otherwise suitably secured to the tube 10. The bar 34 passes between the legs of the U-shaped member 50 and may be selectively adjusted in position with reference to the tube 10 by passing a cotter pin 58 through the holes 52, 54 or 56 as desired and through a corresponding hole 34ª in the bar 34. This adjustment allows for the handling of animals of different sizes with my device.

Still further to increase the utility of my device I attach to the tube 10 the member 60 having the hooked end portions 62 and 64. In the operation of my invention the angle of the bar 34 with reference to the tube 10, and consequently the distance of the yoke 36 from the external loop of the cable 28, is first adjusted to suit the size of the animal to be handled by passing the pin 58 through the appropriate holes 52, 54 or 56 and 34ª as above described.

The external loop of the cable 28 is then pulled out to a suitable extent, the chain 30 being at the same time guided through the enlarged portion 14 of the hole in the cap 12. The user then maneuvers to encircle the snout of the animal with the external loop of the cable 28 and when this is accomplished the animal is secured by pulling on the chain 30, which tightens the cable 28 about the snout of the animal. The chain is then locked by slipping a link into the slot 16.

If all that is desired is to lead the animal, as for example to take it from one pen to another or to lead it into a stock truck, no further manipulation of the device is required.

To release the animal, of course the chain is slipped out of the clot 16 into the enlarged portion 14 and the tension on the chain is released. The cable 28 can then be shaken free of the animal's snout.

However, the value of my device for the farmer and stock handler is by no means encompassed merely in the use above suggested. By bringing the yoke 37 over the shoulder of an animal such as the hog 66 in Figure 7 and bearing down on the handle end (i. e., the portion adjacent the cap 12) of the tube 10, the head of the creature may be raised for inspection, or for better controlling or holding him in position for medical or other attention. Substantially the same procedure may be employed when the animal is lying down. This use of my device is appropriate, for example, in connection with ringing, marking, vaccinating or similar operations.

In addition, have provided a valuable and useful means for opening the mouth. When the animal has been caught as first above described and the yoke 36 has been brought over his shoulder to better control him, I engage an end of a chain 68 in the hooked end portion 62 of the member 60, while the snout of the animal is still encircled by the cable 28. I then work the chain 68 into the animal's mouth and hook a link of the chain 68 into the portion 64 of the member 60, thus firmly engaging the upper jaw of the animal. The cable 28 can then be released and slipped off. Under these circumstances when the handle end of the tube 10 is pressed downwardly the head of the animal will be raised and his mouth opened. This is the stage of the operation of my device illustrated in Figure 7.

My invention thus supplies a very serviceable means for inspection, drenching or giving capsules.

Several additional features of my device which facilitate its operation should be noted. At the connection of the cable 28 and the chain 30 I affix a stop washer 70. This washer by engagement with the inner surface of the cap 12 prevents the cable 28 from being retracted within the tube 10 more than some predetermined amount, which will leave a sufficient external loop to be easily grasped. This prevents the external loop from being accidentally pulled so tightly that it would be difficult to reset my device for operation without the use of some tool for pulling the cable out again.

As previously pointed out, I form the outer end 22 of the hole 20 in a substantially conical or rounded shape. This prevents unnecessary wear on the cable 28 and also makes it easier to secure sufficient tension in the external loop of the cable in the operation thereof, which might otherwise be made difficult by the friction of the cable against the edges of the hole 22.

Although in Figure 7 I have shown my device as being employed on a hog, yet it can be used successfully on other domestic stock.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a device for handling animals, a handle, a loop attached thereto for engaging the muzzle of an animal, a yoke member mounted on said handle and adapted for engaging the shoulder of an animal, a flexible element having one end thereof attached to said handle adjacent said loop and means for adjustably fastening the free end of said flexible element with relation to said handle.

2. In a device for handling animals, a handle, a loop attached thereto for engaging the muzzle of an animal, a yoke member having one end pivotally mounted on said handle and having its other end shaped to fit the back of an animal, and a spacer member mounted on said handle and adapted for adjustable engagement with said yoke member.

3. In a device for handling animals, a handle, a loop attached thereto for engaging the muzzle of an animal, a yoke member having one end mounted on said handle and having its other end shaped to fit the back of an animal, a spacer member mounted on said handle and connected with said yoke member, a flexible element having one end thereof attached to said handle adjacent said loop and means for adjustably fastening the free end of said flexible element with relation to said handle.

4. In a device for handling animals, a tube, a flexible member passing through said tube, the portion of said flexible member adjacent one end thereof being formed in a loop externally of said tube and said end thereof being fastened to said tube, an aperture in said tube, the other end of said flexible member passing out through said aperture, a stop member fixedly attached to said flexible member within said tube, said stop member being of greater size than said aperture, a yoke mounted on said tube and adapted for engaging the back of an animal, and means for adjusting the distance from said yoke to the end of said tube at which the loop is formed.

5. In a device for handling animals, a tube, a flexible member passing through said tube, the portion of said flexible member adjacent one end thereof being formed in a loop externally of said tube and said end thereof being fastened to said tube, an aperture in said tube, the other end of said flexible member passing out through said aperture, a stop member fixedly attached to said flexible member within said tube, said stop member being of greater size than said aperture, a yoke member mounted on said tube and adapted for engaging the shoulder of an animal, a chain having one end thereof attached to said tube adjacent said loop and means for adjustably fastening the free end of said chain with relation to said tube.

6. In a device for handling animals, a tube, a flexible member passing through said tube, the portion of said flexible member adjacent one end thereof being formed in a loop externally of said tube and said end thereof being fastened to said tube, an aperture in said tube, the other end of said flexible member passing out through said aperture, a stop member fixedly attached to said flexible member within said tube, said stop member being of greater size than said aperture, a flexible element having one end thereof attached to said tube adjacent said loop and means for adjustably fastening the free end of said flexible element with relation to said tube.

7. In an apparatus for handling animals, a tubular handle member, a flexible cable having one end attached to the bottom end of said handle member, a loop formed by said cable externally of said handle member, the cable then passing into said handle member, a chain attached to said cable inside said handle member, forming a continuation of said cable and passing out through the upper end of said handle member, means formed on said handle member for engaging said chain to maintain it in position against tension in said cable, a yoke member having one end pivotally mounted on said handle member and having its other end shaped to fit the back of an animal and a spacer member mounted on said handle member and adapted for adjustable engagement with said yoke member.

8. In an apparatus for handling animals, a tubular handle member, a flexible cable having one end attached to the bottom end of said handle member, a loop formed by said cable externally of said handle member, the cable then passing into said handle member, a chain attached to said cable inside said handle member forming a continuation of said cable and passing out through the upper end of said handle member, means on said handle member for engaging said chain to maintain it in position against tension in said cable, a yoke member having one end pivotally mounted on said handle member and having its other end shaped to fit the back of an animal, means for locking said yoke member against pivotal movement, a second chain having one end thereof mounted on said handle member adjacent the bottom end thereof and an element on said handle member adapted to engage the free end of said chain.

9. In an apparatus for handling animals, a handle member, a flexible member attached to one end of said handle member, a loop formed in the portion of said flexible member adjacent the fastening thereof, means on said handle member for engaging said flexible member to maintain it in position against tension in said loop, a yoke member mounted on said handle and adapted for engaging the shoulder of an animal, a flexible element having one end thereof attached to said handle member adjacent said loop, and means for adjustably fastening the free end of said flexible element with relation to said handle member.

10. In an apparatus for handling animals, a handle member, guide means on said handle member, a flexible element passing through said guide means, a loop formed in said flexible element, means on said handle for engaging said flexible member to maintain it in position against tension in said loop, a yoke member mounted on said handle and adapted for engaging the shoulder of an animal, and adjusting means for varying the spacing of said yoke from said loop.

11. In an apparatus for handling animals, a handle member, guide means on said handle member, a flexible element passing through said guide means, a loop formed in said flexible element, means on said handle for engaging said flexible element to maintain it in position against tension in said loop, a flexible member having one end thereof attached to said handle member adjacent said loop, and means for adjustably fastening the free end of said flexible member with relation to said handle member.

DAVID WATSON THOMPSON.